US011426703B2

(12) United States Patent
Norris et al.

(10) Patent No.: US 11,426,703 B2
(45) Date of Patent: Aug. 30, 2022

(54) GAS PROCESSING DEVICE AND METHOD

(71) Applicant: ZELP LTD, London (GB)

(72) Inventors: Francisco Norris, London (GB); Patricio Norris, London (GB)

(73) Assignee: ZELP LTD, London (GB)

( * ) Notice: Subject to any disclaimer, the term of this patent is extended or adjusted under 35 U.S.C. 154(b) by 191 days.

(21) Appl. No.: 16/623,827

(22) PCT Filed: Jun. 20, 2018

(86) PCT No.: PCT/GB2018/000096
§ 371 (c)(1),
(2) Date: Dec. 18, 2019

(87) PCT Pub. No.: WO2018/234729
PCT Pub. Date: Dec. 27, 2018

(65) Prior Publication Data
US 2021/0138428 A1    May 13, 2021

(30) Foreign Application Priority Data
Jun. 20, 2017  (EP) ..................................... 17176994

(51) Int. Cl.
  *B01J 19/24*  (2006.01)
  *B01J 4/00*   (2006.01)
  *B01J 12/00*  (2006.01)
  *A01K 15/00*  (2006.01)

(52) U.S. Cl.
  CPC .............. *B01J 19/24* (2013.01); *B01J 4/008* (2013.01); *B01J 12/007* (2013.01); *B01J 2204/002* (2013.01); *B01J 2219/00186* (2013.01)

(58) Field of Classification Search
  CPC .................. B01J 4/008; B01J 2204/002; B01J 2219/00186; B01J 19/24; B01J 12/007; A01K 15/003; A01K 29/00; A47C 9/002; A47C 4/54; A47C 7/142; A47C 7/42; A47C 7/46; A47C 13/00; C01B 2203/1241
  USPC ....................................................... 502/300
  See application file for complete search history.

(56) References Cited

U.S. PATENT DOCUMENTS

2010/0279180 A1   11/2010   Herrema et al.
2012/0115240 A1    5/2012   Caldeira et al.

FOREIGN PATENT DOCUMENTS

| CN | 103229054 A | 7/2013 |
| CN | 204032059   | 12/2014 |
| CN | 105987391 A | 10/2016 |
| GB | 2450506     | 12/2008 |
| JP | 2008086942 A | 4/2008 |
| JP | 2006312143 A | 4/2009 |

(Continued)

OTHER PUBLICATIONS

Google translation of UA-97818C2 (Year: 2022).*

(Continued)

*Primary Examiner* — Huy Tram Nguyen
(74) *Attorney, Agent, or Firm* — Blanchard & Associates

(57) ABSTRACT

A methane conversion device comprises a reaction chamber; a sensor for detecting the presence of methane; blowing means for directing external gasses Into the reaction chamber when the sensor detects the presence of methane above a predetermined threshold; conversion means that are configured to oxidise methane; and positioning means for positioning the device on an animal.

20 Claims, 2 Drawing Sheets

(56) References Cited

FOREIGN PATENT DOCUMENTS

| | | | | |
|---|---|---|---|---|
| RU | 2548878 | C2 | 2/2014 | |
| RU | 2560985 | C2 | 8/2015 | |
| UA | 97818 | C2 * | 11/2007 | ................ C10I 3/06 |
| WO | 2011130538 | A2 | 10/2011 | |
| WO | 2012013235 | A1 | 2/2012 | |
| WO | 2013068341 | A1 | 1/2013 | |
| WO | 201607331 | A2 | 12/2016 | |

OTHER PUBLICATIONS

Zioiu, Zu , "Chinese First Office Action"; Application or Patent No. 201880041642.2; pp. 1-11; dated Mar. 30, 2021.

Majumdar, Subhatosh , "India Examination Report Application No. 201937053200", dated Aug. 10, 2021, 5 Pages.

Sasaki, Noriko , "Japanese First Office Action", dated Mar. 3, 2022, 8 Pages.

Sayan, O.S., "Russian First Office Action", dated Jul. 28, 2021, 14 Pages.

Sayan, O.S., "Russian Search Report Application No. 2019144640 04", dated Jul. 9, 2021, 4 Pages.

* cited by examiner

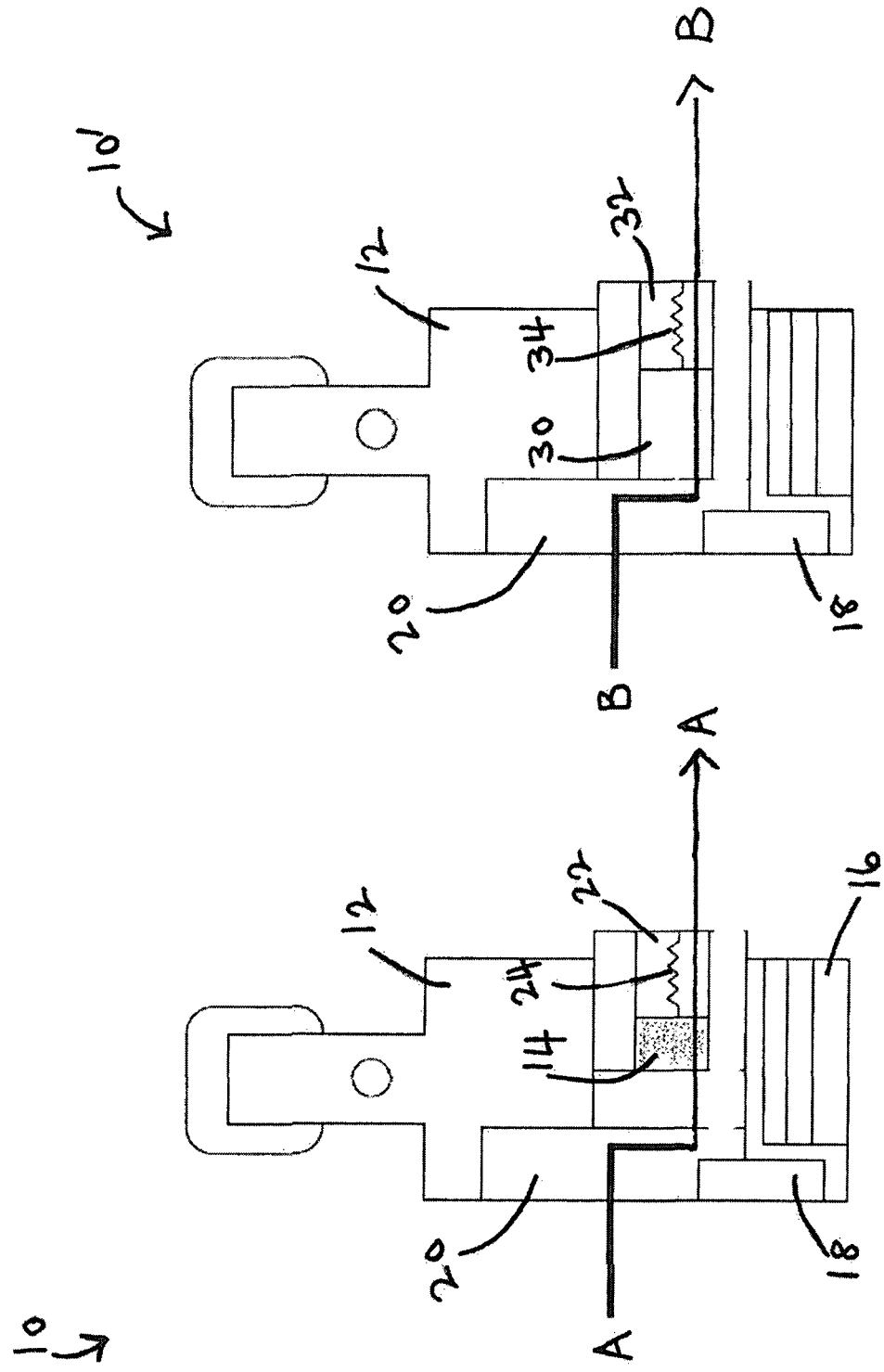

GAS PROCESSING DEVICE AND METHOD

FIELD OF THE INVENTION

The present invention relates to a gas processing device for oxidising methane gas, particularly a gas processing device for oxidising methane gas from livestock.

BACKGROUND TO THE INVENTION

Methane is known to be a potent greenhouse gas, having a global warming potential that is considerably higher than that of carbon dioxide. Livestock are known to be a significant source of methane gas, which is released via belching and flatulence, and this may have direct economic consequences for livestock producers, as they may be subject to taxes based on their carbon footprint.

For these reasons, it is desirable to reduce methane emissions from livestock.

SUMMARY OF THE INVENTION

Therefore, at its most general, the present invention may provide a device for reducing the methane content of gaseous emissions from animals such as livestock. This may be achieved by providing a device that may be worn by the animal and that is adapted to draw the animal's gaseous emissions into a reaction chamber in which conversion means are provided for oxidising the methane present in the emissions. The principal products of the oxidation process are typically carbon dioxide and water, which are considered to have lower global warming potential than methane.

In a first aspect, the present invention may provide a methane conversion device comprising:
  a reaction chamber;
  a sensor for detecting the presence of methane;
  blowing means for directing external gasses into the reaction chamber when the sensor detects the presence of methane above a predetermined threshold;
  conversion means that are configured to oxidise methane; and
  positioning means for positioning the device on an animal.

Typically, the blowing means are configured to direct external gasses into the reaction chamber when the sensor detects the presence of methane above 100 ppm, possibly above 150 ppm. The blowing means may be provided by e.g. an axial flow fan. The blowing means may assist in allowing methane detected by the sensor to be captured by the device before it disperses into the air.

The presence of a sensor for detecting methane allows the device to be activated only when a predetermined level of methane is detected. This allows efficient use of any power sources (e.g. batteries) that are required to power the device.

In general, the reaction chamber has a volume less than 200 ml, possibly less than 150 ml. The reaction chamber may be provided by the exhaust of the device.

Typically, the conversion means comprise a heating element, which may be e.g. a wire. In certain cases, the wire has a coiled configuration.

Preferably, the heating element is a metallic resistance heating element. The metallic resistance heating element typically comprises a metallic alloy selected from the group comprising: nickel-chromium alloys, nickel-iron alloys, iron-chromium-aluminium alloys, stainless steel, tungsten alloys, or copper-nickel alloys. Preferably, the heating element comprises nickel as its principal component. For example, the heating element may be provided by a nichrome wire.

In certain embodiments, the heating element may be located within the reaction chamber.

In these embodiments, the device may comprise filtration means that are configured to inhibit the entry of one or more gaseous species other than methane into the reaction chamber (that is: some, but not necessarily all external gasses are directed into the reaction chamber by the blowing means). This helps to increase the methane concentration in the reaction chamber to a level above the lower explosive limit of methane (this is typically about 4% by volume of air, depending on temperature and pressure), so that the methane becomes oxidised as it passes over the heating element. The filtration means may comprise one or more of the following: charcoal, activated carbon, or a strong base such as potassium hydroxide. These filtration means principally inhibit the passage of carbon dioxide, but other filtration means may be provided that inhibit the passage of other gaseous species.

In other embodiments, the device may comprise trapping means that are configured to trap methane before it enters the reaction chamber e.g. through absorption of the methane. Such trapping means typically permit the passage of nitrogen and oxygen into the reaction chamber. Thus, some but not all external gasses are directed into the reaction chamber by the blowing means.

Such trapping means may be provided by a porous material such as a zeolite. The presence of the trapping means allows the concentration of methane to be increased before it enters the reaction chamber. Methane may be released from the trapping means through the action of a further heating element that is configured to heat the trapping means. In certain embodiments, a carbon dioxide filter may be provided between the blowing means and the trapping means, in order to limit the amount of carbon dioxide arriving at the trapping means, so as to increase the capacity of the trapping means to trap methane.

It is thought that zeolites trap methane more effectively when the methane impinges on the zeolite at higher speed and hence higher partial pressure. This represents a further potential benefit of providing blowing means in the device.

In other embodiments, the conversion means may comprise additionally a catalyst, the catalyst being located within the reaction chamber. Typically, the catalyst comprises one or more of the following: palladium, copper, or silica.

In these embodiments, the catalyst is adapted to facilitate the conversion of methane to carbon dioxide and water. The catalyst is typically in thermal contact with a heating element e.g. a wire.

Preferably, the heating element is a metallic resistance heating element. The metallic resistance heating element typically comprises a metallic alloy selected from the group comprising: nickel-chromium alloys, nickel-iron alloys, iron-chromium-aluminium alloys, stainless steel, tungsten alloys, or copper-nickel alloys. Preferably, the heating element comprises nickel as its principal component. For example, the heating element may be provided by a nichrome wire.

Typically, the means for positioning the device on the animal are configured to allow the device to be attached to the animal's nose (so as to convert the methane released in the animal's exhalations). Thus, the means for positioning the device on an animal may comprise a nose ring that is configured for attachment to an animal, for example a bovine. In other embodiments, the means for positioning the device may comprise a clip, e.g. two opposed resilient arms that are configured to retain a portion of the animal's body, such as the septum, therebetween.

It is beneficial for the device to be positioned such that it is able to capture methane exhaled from the mouth of the animal (e.g. a bovine), as this typically represents the major proportion of the methane exhalations from an animal.

In other embodiments, the device may be configured to be attached, for example clipped, to the animal's tail, to allow the device to process gasses emitted through flatulence.

Devices according to the first aspect of the invention may provide a means for obtaining data about the methane exhalation of animals such as bovines, which may be of importance to farmers, as well as pharmaceutical companies, nutritional/feed companies, and government organisations.

In a second aspect, the present invention may provide a methane conversion device comprising:
a reaction chamber comprising conversion means that are configured to oxidise methane;
a methane retention component;
means for causing methane to be released from the methane retention component into the reaction chamber;
a sensor that is adapted to detect the presence of methane within gas exterior to the methane conversion device;
blowing means configured to drive gas from the exterior of the device onto the methane retention component when the sensor detects the presence of methane above a predetermined threshold; and
positioning means for positioning the device on an animal.

Typically, the methane retention component comprises a chamber containing a porous material that is configured to reversibly absorb methane. Typically, the porous material is provided by a zeolite mineral.

In general, a carbon dioxide filter is provided between the blowing means and the methane retention component, the carbon dioxide filter being configured to inhibit the passage of carbon dioxide to the methane retention component.

Preferably, the means for causing methane to be released from the methane retention component into the reaction chamber comprises a heating element.

The reaction chamber, sensor, blowing means, conversion means and positioning means may correspond to any of the equivalent components of the device according to the first aspect of the invention.

DETAILED DESCRIPTION

The invention will now be described by way of example with reference to the following Figures in which:

FIG. 3 shows a cross-sectional view of the device of FIG. 1;

FIG. 4 shows a cross-sectional view of a second embodiment of a methane conversion device according to the first aspect of the present invention.

Figure 2:
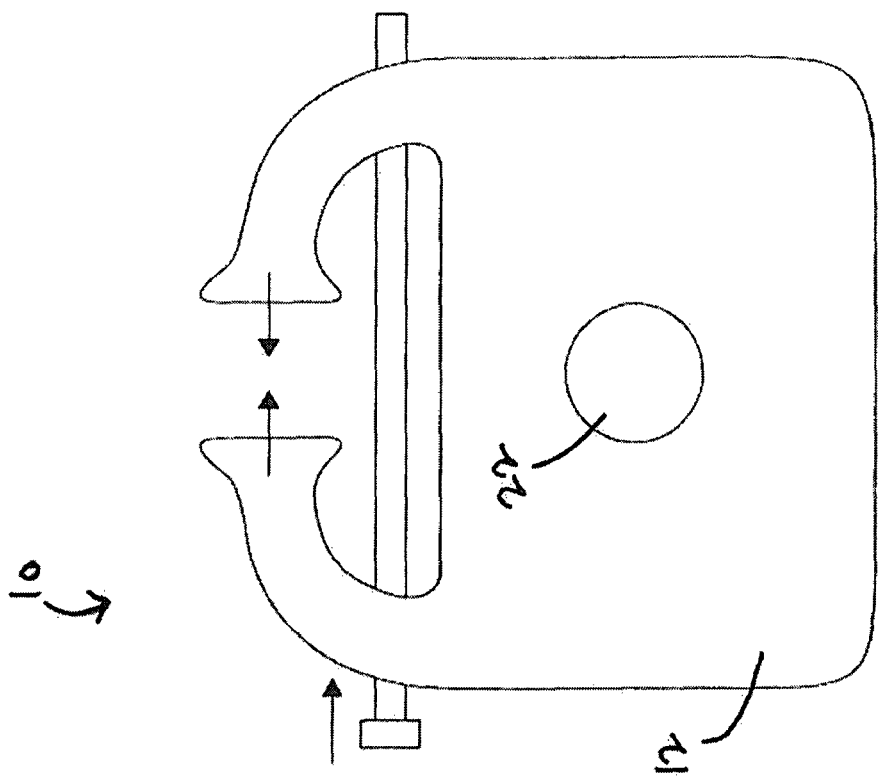
FIG. 2 shows a schematic rear elevation view of the device of FIG. 1.
Figure 1:
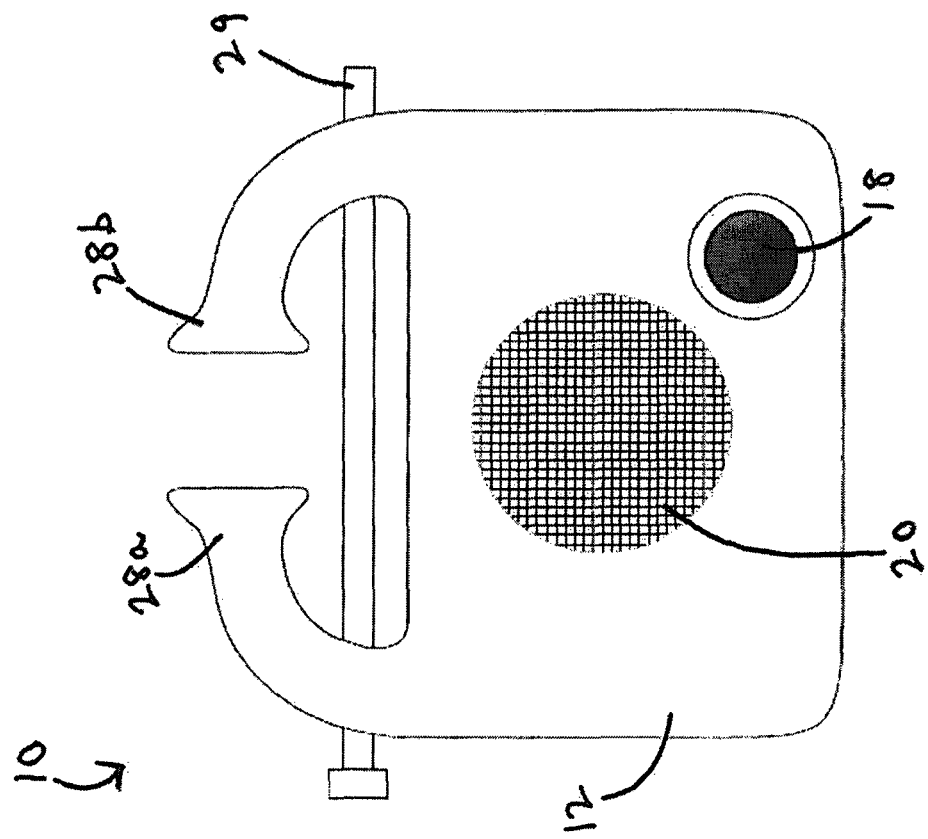
FIG. 1 shows a schematic front elevation view of a first embodiment of a methane conversion device according to a first aspect of the present invention.

Referring to FIGS. 1-3, a methane conversion device 10 comprises a housing 12 in which are provided a reaction chamber 14 and a battery compartment 16. The housing further comprises a methane sensor 18 disposed on the front side of the conversion device and blowing means 20 located adjacent the methane sensor 18 on the front side of the combustion device. Blowing means 20 are provided by an axial flow fan that is configured to drive gas from the exterior of the device towards reaction chamber 14.

Exhaust 22 is provided on the rear side of conversion device 10 and adapted to channel a gas stream from reaction chamber 14 towards the exterior of the device 10.

A palladium-containing catalytic bed is located within reaction chamber 14. The catalytic bed is in thermal contact with nichrome wire heating element 24

Opposed arms 28a,b are configured to retain the septum of the bovine therebetween. Tensioning bar 29 allows opposed arms 28a,b to be pulled closer together.

In use, opposed arms 28a,b are positioned on either side of the septum of the bovine and tensioning bar 29 is tightened so that opposed arms 28a,b retain the septum securely therebetween. Conversion device 10 is oriented such that the front side of the device faces the bovine's mouth. When the sensor 18 detects a methane concentration greater than e.g. 200 ppm, the blowing means 20 are activated to direct the exhaled gas from the bovine into reaction chamber 14. The catalyst in reaction chamber 14 is heated to a temperature of e.g. 600-700° C. by the nichrome wire heating element 24. The methane gas passing over the catalyst is oxidised to form principally water vapour and carbon dioxide, which are expelled from the device via exhaust 22.

Thus, the gas flow through the device follows the path denoted by arrow A-A.

An alternative embodiment of the combustion device is shown in FIG. 4 that has the same features as the embodiment of FIGS. 1-3, except that a filter 30 is provided between the blowing means 20 and the exhaust 32, instead of a catalyst. The filter 30 absorbs gasses such as carbon dioxide that are also present in the bovine exhalation, in order to increase the concentration of methane in the gas being transferred to the exhaust 32.

In this embodiment, the reaction chamber is provided within the exhaust 32. The reaction chamber comprises a nichrome wire heating element 34.

Other features of this alternative embodiment of the combustion device are the same as for the embodiment of FIGS. 1-3, and are denoted by like numerals.

In use, opposed arms 28a,b are positioned on either side of the septum of the bovine and tensioning bar 29 is tightened so that opposed arms 28a,b retain the septum securely therebetween. The combustion device 10' is oriented such that the front side of the device faces the bovine's mouth. When the sensor 18 detects a methane concentration greater than e.g. 200 ppm, blowing means 20 are activated to direct the exhaled gas from the bovine through filter 30 and into exhaust 32.

Filter 30 extracts carbon dioxide from the gas stream, so as to increase the methane concentration to a level above the lower explosive limit of methane, which is approximately 4% by volume of air, depending on temperature and pressure. Once the gas stream enters exhaust 32 it passes over nichrome wire heating element 34, which is heated to a temperature of 700-800° C. The heating element 34 causes the methane in the gas stream to become oxidised to form principally carbon dioxide and water vapour, which are then expelled from the device via exhaust 32.

Thus, the gas flow through the device follows the path denoted by arrow B-B.

In a variant of the embodiment of FIG. 4, the filter 30 is provided by a chamber containing zeolite particles that are adapted to trap methane and carbon dioxide, while allowing nitrogen and oxygen to pass through into the reaction chamber 32. Once the zeolite particles reach saturation point (that is, they are not able to absorb any more carbon dioxide or methane), a filter heating element (not shown) is activated. This causes the trapped methane to be released into the reaction chamber 32 at a relatively high concentration, so that it may become oxidised as it passes over heated nichrome wire 34. This arrangement helps to ensure that the methane concentration in the reaction chamber 32 is above the lower explosive limit of the methane.

In a further modification of this variant, a further filter (not shown) is provided between blowing means 20 and the zeolite-containing chamber 30, the further filter being adapted to limit the amount of carbon dioxide arriving at the zeolite-containing chamber 30, so that the capacity of the zeolite particles to trap methane is increased.

The invention claimed is:

1. A methane conversion device comprising:
    a reaction chamber comprising conversion means that are configured to oxidize methane;
    a methane retention component;
    means for causing methane to be released from the methane retention component into the reaction chamber;
    a sensor that is adapted to detect the presence of methane within gas exterior to the methane conversion device;
    blowing means configured to drive gas from the exterior of the device onto the methane retention component when the sensor detects the presence of methane above a predetermined threshold; and
    positioning means for positioning the device on an animal.

2. The device of claim 1, wherein the methane retention component comprises a chamber containing a porous material that is configured to reversibly absorb methane.

3. The device of claim 2, wherein the porous material is provided by a zeolite mineral.

4. The device of claim 1, wherein a carbon dioxide filter is provided between the blowing means and the methane retention component, the carbon dioxide filter being configured to inhibit the passage of carbon dioxide to the methane retention component.

5. The device of claim 1, wherein the means for causing methane to be released from the methane retention component into the reaction chamber comprises a heating element.

6. A methane conversion device comprising:
    a reaction chamber;
    a sensor that is adapted to detect the presence of methane within gas exterior to the methane conversion device;
    blowing means configured to drive gas from the exterior of the device towards the reaction chamber when the sensor detects the presence of methane above a predetermined threshold;
    conversion means that are configured to oxidize methane; and
    positioning means for positioning the device on an animal.

7. The methane conversion device of claim 6, wherein the blowing means are configured to drive gas towards the reaction chamber when the sensor detects the presence of methane above 100 ppm.

8. The methane conversion device of claim 6, wherein the reaction chamber has a volume less than 200 ml.

9. The methane conversion device of claim 6, wherein the conversion means comprises a heating element.

10. The methane conversion device of claim 9, wherein the heating element comprised in the conversion means is a wire.

11. The methane conversion device of claim 9, wherein the heating element comprised in the conversion means is a metallic resistance heating element.

12. The methane conversion device of claim 11, wherein the metallic resistance heating element comprises principally nickel.

13. The methane conversion device of claim 12, wherein the metallic heating element is a nichrome wire.

14. The methane conversion device of claim 9, wherein the heating element comprised in the conversion means is located within the reaction chamber.

15. The methane conversion device of claim 6, wherein the device comprises filtration means that are configured to inhibit the entry of one or more gaseous species other than methane into the reaction chamber.

16. The methane conversion device of claim 6, wherein the device comprises trapping means that are configured to trap methane before it enters the reaction chamber.

17. The methane conversion device of claim 9, wherein the conversion means comprise additionally a catalyst, the catalyst being located within the reaction chamber.

18. The methane conversion device of claim 17, wherein the catalyst comprises palladium.

19. The methane conversion device of claim 6, wherein the means for positioning the device on an animal comprise a nose ring.

20. A method of converting methane emitted from an animal into other chemical species, comprising the steps of positioning the device of claim 6 on an animal.

* * * * *